United States Patent
Jiang et al.

(10) Patent No.: US 9,569,180 B1
(45) Date of Patent: Feb. 14, 2017

(54) APPLICATION DEVELOPMENT IN CLOUD BASED ENVIRONMENT

(71) Applicant: International Business Machines Corporation, Armonk, NY (US)

(72) Inventors: Tan Jiang, Beijing (CN); Da Hu Kuang, Beijing (CN); Ling Lan, Beijing (CN); Wei Feng Li, Beijing (CN); Jing Jing Pan, Beijing (CN); Shu Chao Wan, Beijing (CN); Li Yi, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/926,111

(22) Filed: Oct. 29, 2015

(51) Int. Cl.
*G06F 9/44* (2006.01)
*G06F 17/30* (2006.01)
*G06F 17/24* (2006.01)

(52) U.S. Cl.
CPC ............ *G06F 8/30* (2013.01); *G06F 17/248* (2013.01); *G06F 17/30345* (2013.01); *G06F 17/30477* (2013.01)

(58) Field of Classification Search
CPC .... G06F 8/30; G06F 17/248; G06F 17/30345; G06F 17/30477
USPC ................................................ 717/106–108
See application file for complete search history.

(56) References Cited

U.S. PATENT DOCUMENTS

| | | | |
|---|---|---|---|
| 8,200,738 B2 | 6/2012 | Roush et al. | |
| 9,256,467 B1* | 2/2016 | Singh | G06F 9/5055 |
| 2015/0081916 A1 | 3/2015 | McGrath et al. | |
| 2015/0082378 A1 | 3/2015 | Collison | |

OTHER PUBLICATIONS

Felter, et al., "An Updated Performance Comparison of Virtual Machines and Linux Containers", IBM Research Report, RC25482 (AUS1407-001) Jul. 21, 2014. 15 pages. http://www.cs.nyu.edu/courses/fall14/CSCI-GA.3033-010/vmVcontainers.pdf.

Mell, et al., "The NIST Definition of Cloud Computing", Recommendations of the National Institute of Standards and Technology. NIST Special Publication 800-145. Sep. 2011. 7 pages.

Merkel, "Docker: Lightweight Linux Containers for Consistent Development and Deployment", Linux Journal, Article No. 2 vol. 2014 Issue 239, Mar. 2014. Belltown Media, Houston, TX. Last printed Oct. 21, 2015. 2 pages. http://dl.acm.org/citation.cfm?id=2600241.

(Continued)

*Primary Examiner* — Qing Chen
(74) *Attorney, Agent, or Firm* — Jay Wahlquist

(57) ABSTRACT

A computer-implemented method includes monitoring a template registry for changes in the template registry. In response to detecting a new template in the template registry, the method includes analyzing the new template to identify explicit and implicit metadata corresponding to the new template. The method further includes determining one or more possible link dependencies between a container based on the new template and one or more other containers, respectively, based on the identified explicit and implicit metadata. In addition, the method includes providing container setting recommendations to a user based on the one or more possible link dependencies and the identified explicit and implicit metadata.

18 Claims, 6 Drawing Sheets

(56) References Cited

OTHER PUBLICATIONS

Unknown, "Linking Containers Together", Docker Documentation, Version 1. http://docs.docker.com/userguide/dockerlinks/ Last printed May 5, 2015. 7 Pages.
Unknown, "Fast, Isolated Development Environments Using Docker", http://www.fig.sh/ Last printed May 5, 2015. 6 pages.

* cited by examiner

Environment Variables name        value

+ Add variable

Volumes container directory    host directory

+ Add variable

Port Bindings container port    host port

APPLICATION DEVELOPMENT IN CLOUD BASED ENVIRONMENT

BACKGROUND

Use of cloud based application development platforms is increasing. One such cloud based application development platform is known as Docker. Docker technology enables the reuse of images or templates to develop applications. In order to enable communication and data sharing between Docker containers, the correct settings for the respective Docker containers need to be set.

SUMMARY

Aspects of the disclosure provide a method, system, and computer program product for application development in a cloud computing environment. In one embodiment, a computer-implemented method is provided. The method includes monitoring a template registry for changes in the template registry. In response to detecting a new template in the template registry, the method includes analyzing the new template to identify explicit and implicit metadata corresponding to the new template. The method further includes determining one or more possible link dependencies between a container based on the new template and one or more other containers, respectively, based on the identified explicit and implicit metadata. In addition, the method includes providing container setting recommendations to a user based on the one or more possible link dependencies and the identified explicit and implicit metadata.

The above summary is not intended to describe each illustrated embodiment or every implementation of the present disclosure.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
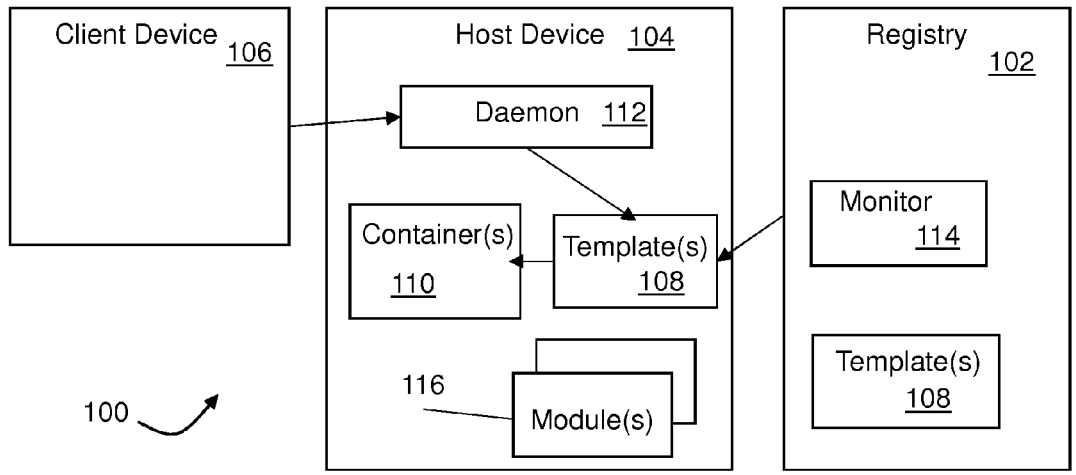
FIG. 1 is a high level block diagram of one embodiment of an enhanced application development system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a high level block diagram of one embodiment of an enhanced application development system 100. In particular, system 100 is an enhanced Docker platform in this example. The Docker platform is a platform for developing, shipping, and running applications, as understood by one of skill in the art. It is to be understood, however, that other cloud-based development platforms can be used in other embodiments.

System 100 includes a registry 102, a host device 104, and a client device 106. The registry 102 is configured to store templates 108 which are also referred to herein with respect to the illustrative Docker platform as Docker images. The terms image and template can be used interchangeably herein. The registry 102 can include both public templates, which can be shared with any user, and private templates, which are only available to authorized users. As understood by one of skill in the art, Docker images are used to build applications or other templates. For example, a Docker image can include an operating system and a web application template.

The host device 104 is configured to retrieve templates 108 from the registry 102 and produce respective containers 110 based on the templates 108 and input from a user via the client device 106 which provides a user interface. In particular, the host device 104 includes a daemon 112 configured to enable interaction between the client device 106 and the host device 104 for configuring and running containers 110. Docker daemons are known to one of skill in the art and not described in more detail herein. Additionally, as understood by one of skill in the art, Docker containers hold the needed code and information for an application to run. Each container 110 is an isolated and secure application platform.

The enhanced system 100 also includes a registry monitor 114 which is configured to monitor the registry 102 for changes. In response to detecting a new image or template uploaded to the registry 112, the monitor 114 triggers modules 116 to analyze the new template to determine explicit and implicit metadata which is used to provide recommendations to a user to set the correct attributes and settings for a corresponding container to execute properly. The modules 116 are discussed in more detail below.

Figure 2:
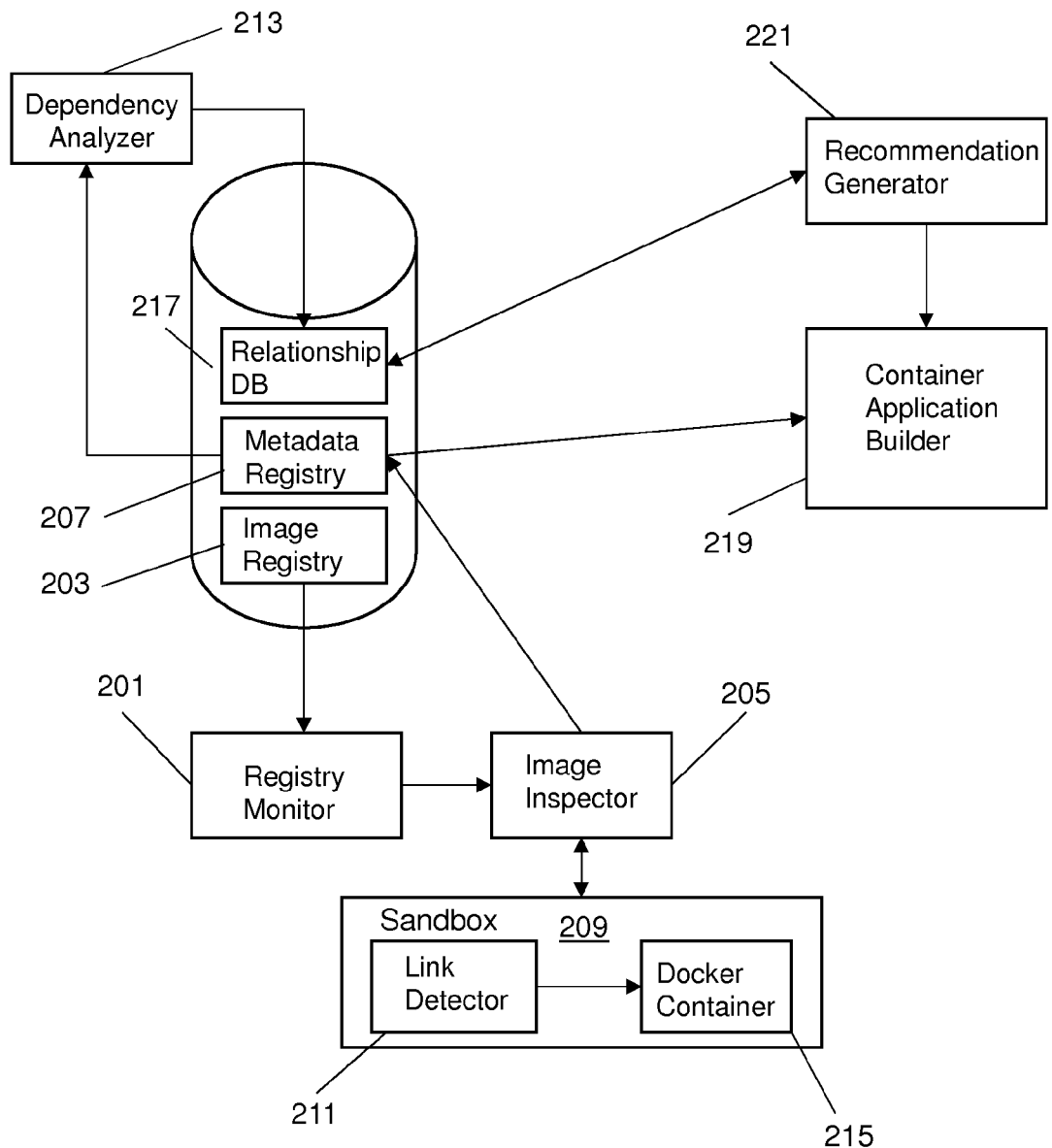
FIG. 2 is one embodiment of an example data flow diagram depicting data flow between modules of an enhanced application development system.

FIG. 2 is one embodiment of an example data flow diagram depicting data flow between modules of an enhanced application development system, such as system 100 in FIG. 1. The registry monitor module 201 monitors the template or image registry 203 to detect changes to the registry 203. In response to detecting a new template/image in the template registry, the registry monitor module 201 triggers the image inspector module 205. The image inspector module 205 is configured to inspect the new image detected by the monitor module 201 to extract explicit metadata contained in the new image. As used herein, metadata includes environment variables, port bindings, volume bindings, etc. Hence, explicit metadata includes metadata that is explicitly identified in the template itself. In contrast, implicit metadata includes metadata (e.g. environment variables, port bindings, volume bindings, etc.) that is identified based on how the template executes (e.g. which environment variables are referenced during execution).

The image inspector module 205 stores the explicit metadata in the metadata registry 207. The image inspector module then runs the new template in a test environment 209 or "Sandbox". As understood by one of skill in the art, a Sandbox is a restricted operating system environment which controls the resources that the template can use. For example, in some embodiments, the Sandbox 209 is implemented as a modified kernel of a Linux based operating system. The Sandbox 209 is modified to include a link detector module 211 which is configured to generate linkage recommendation information. In particular, as processes of the new template are executed in the Sandbox 209, the link detector module 211 records the new templates attempted accesses of environmental variables which may be in other containers or images 215. For example, the link detector module 211 can be implemented by adding a hook to the system call getenv( ), in some embodiments, such that when a process is launched, the hook can record the accesses of environmental variables. The image inspector module 205 then stores the recorded environmental variables that were accessed in the metadata registry 207.

The dependency analyzer module 213 analyzed the metadata stored in the metadata registry 207 by the image inspector module 205. The dependency analyzer module 213 consolidates the metadata retrieved from the metadata registry to identify which environment variables are defined according to the convention used by the system (e.g. Docker convention in this example). For example, the link detector module 211 may determine that a given image attempts to access the environment variables MYSQL_ENV_DB_USER and MYSQL_ENV_DB_PASS. Hence, the dependency analyzer module 213 determines that these variables conform to a typical convention for environment variables. In particular, the variables are generated via a Docker link with the alias "MYSQL" and that the values are from the target containers with the names "DB_USER" and "DB_PASS", respectively. The dependency analyzer module 213 then analyzes metadata corresponding to other images in the metadata registry to find one or more images which match the alias and target containers for the environment variables. For example, the dependency analyzer module 213 may find an image with the alias "pure/mysql" which provides both DB_PASS and DB_USER. Thus, the dependency analyzer modules 213 then stores a match record in the relationship database 217 which indicates that the new image may be linked to the pure/mysql image.

Figures 5A, 5B:
FIG. 5A-5B depicts one embodiment of example graphical user interfaces providing configuration settings to a user.

When a user builds a container application based on the new image, the container application builder module 219 retrieves the corresponding metadata from the metadata registry 207. In addition, the recommendation generator module 221 retrieves one or more match records from the relationship database 217 and provides a recommendation for attributes and settings to properly execute the container application to the container application builder module 219. The container application builder module 219 provides the recommended attributes and settings to the user via a graphical user interface on the client device. One example of the graphical user interface for providing recommended attributes and settings is shown and described below with respect to FIGS. 5A and 5B.

The modules described with respect to FIG. 2 can be implemented via computer-readable instructions stored on computer-readable medium and executed by at least one programmable processor. In addition, the instructions corresponding to the various modules need not be stored on the same medium or executed by the same processor. Rather, in some embodiments, some modules are executed by one programmable processor while other modules are executed by a physically separate processor. Additionally, in some embodiments, one or more of the modules can be implemented in hardware via semiconductor devices, chips, logical gates, circuits, circuit cards, and/or other physical hardware devices (e.g., ASIC or FPGA) in lieu of, or in addition to, a processor-based system.

One example of a processor-based device configured to implement one or more of the modules described above is shown in FIG. 3. The computing device 300 is one example of a suitable computer system and is not intended to suggest any limitation as to the scope of use or functionality of the embodiments described herein. Computer system 300 is configured to perform the functionality set forth herein. The components in the computer system 300 are operational with numerous other general purpose or special purpose computing system environments or configurations. Examples of well-known computing systems, environments, and/or configurations that may be suitable for use with computing device 300 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computing device 300 may be described in the general context of computer system-executable instructions, such as program modules, being executed by a computer system 300. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

Figure 3:
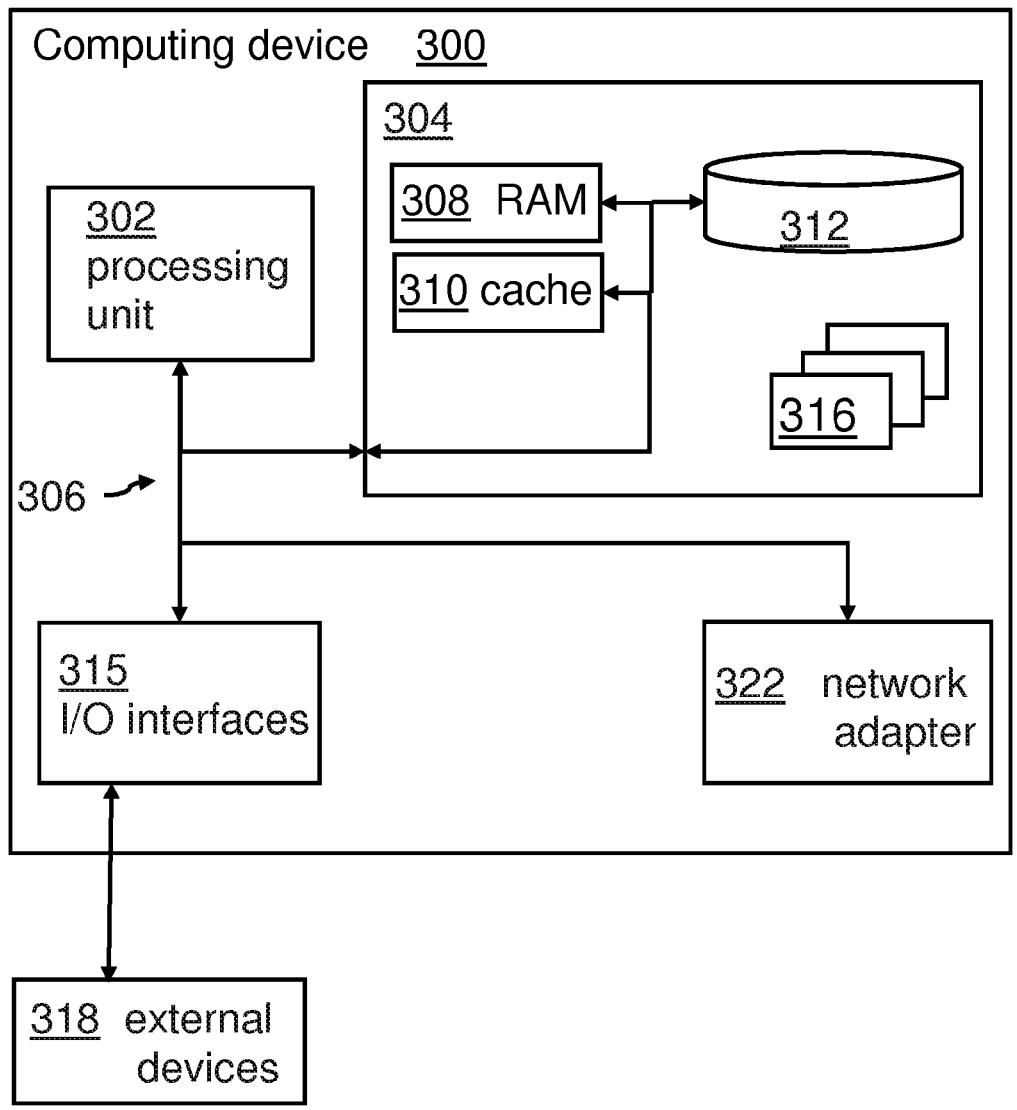
FIG. 3 is a block diagram of one embodiment of an example of a processor-based device configured to implement one or more of application development modules.

In the example of FIG. 3, the components of computing device 300 include, but are not limited to, one or more processors or processing units 302, a system memory 304, and a bus 306 that couples various system components including system memory 304 to the processor 302. Bus 306 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computing device 300 typically includes a variety of computer system readable media. Such media may be any available media that is accessible by computing device 300, and it includes both, volatile and non-volatile media, removable and non-removable media.

The system memory 304 may include computer system readable media in the form of volatile memory, such as random access memory (RAM) 308 and/or cache memory 310. Computing device 300 may further include other removable/non-removable, volatile/non-volatile computer system storage media. By way of example only, storage system 312 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 306 by one or more data media interfaces. As will be further depicted and described below, memory 304 may include at least one program product having one or more program modules 316 that are configured to carry out one or more of the functions of embodiments described herein. In particular, the program modules 316 each generally carry out one or more of the functions involved in identifying and providing the recommended attributes and/or settings to a user. For example, the program modules 316, when executed by the processing unit 302 cause the processing unit to perform one or more of the acts described above with respect to FIGS. 1 and 2 as well as one or more of the acts described below with respect to method 400 in FIG. 4.

The computing device 300 may also communicate with one or more external devices 318 such as a keyboard, a pointing device, a display, etc.; one or more devices that enable a user to interact with computing device 300; and/or any devices (e.g., network card, modem, etc.) that enable computing device 300 to communicate with one or more other computing devices. Such communication can occur via Input/Output (I/O) interfaces 315. Still yet, computing device 300 may communicate with one or more networks such as a local area network (LAN), a general wide area network (WAN), and/or a public network (e.g., the Internet) via network adapter 322. As depicted, network adapter 322 may communicate with the other components of computing device 300 via bus 306. It should be understood that although not shown, other hardware and/or software components could be used in conjunction with computing device 300. Examples, include, but are not limited to: microcode, device drivers, redundant processing units, external disk drive arrays, RAID systems, tape drives, and data archival storage systems, etc.

The processing unit 502 includes or functions with software programs, firmware or other computer readable instructions for carrying out various methods, process tasks, calculations, and control functions, used in the determining and providing recommendations to a user, as described herein.

These instructions are typically stored on any appropriate computer readable or processor-readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

Hence, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
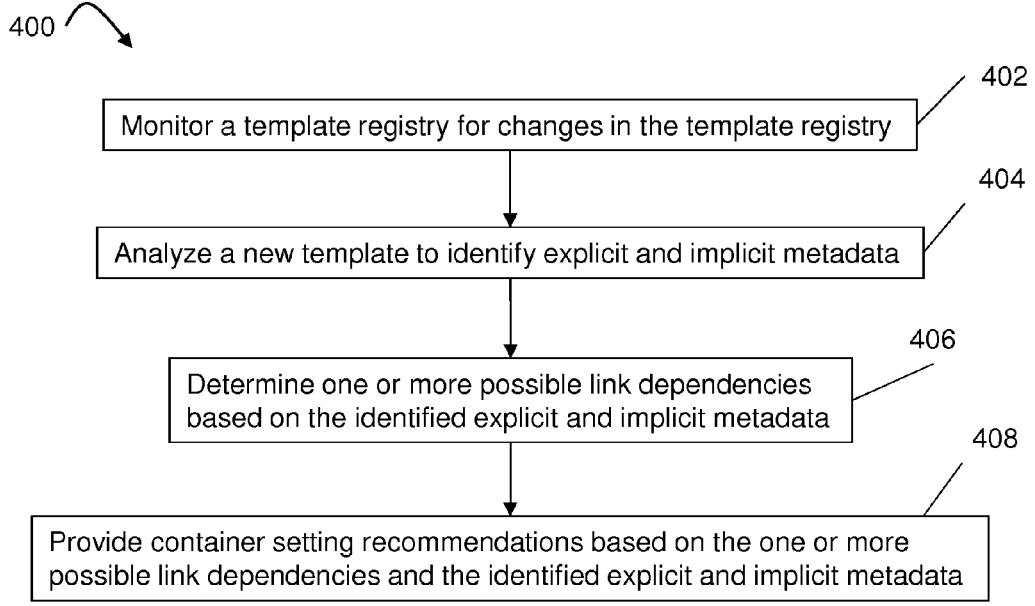
FIG. 4 is a flow chart depicting one embodiment of an illustrative method of composing an application in a cloud environment.

FIG. 4 is a flow chart depicting one embodiment of an illustrative method 400 of composing an application in a cloud environment. The method 400 can be implemented by one or more devices such as computing device 300 in a cloud based system, such as the system 100. It is to be understood that the order in which the various acts of the method are discussed are presented for ease of explanation and is not meant to limit the order in which the various acts may be performed in different implementations of the method 400.

At block 402, a template registry is monitored for changes in the template registry, as discussed above. At block 404, in response to detecting a new template in the template registry, the new template is analyzed to identify explicit and implicit metadata corresponding to the new template. For example, a new template can be uploaded by a user to the template registry. Upon detecting the upload, the uploaded template is analyzed. In some embodiments, analyzing the new template includes extracting explicit metadata from the new template. In addition, in some embodiments, analyzing the new template includes executing one or more processes of the new template in a sandbox to identify implicit metadata, as discussed above. For example, the sandbox is a modified kernel of a Linux based operating system in some embodiments. Analyzing the new template also includes updating a metadata registry with the identified explicit and/or implicit metadata, in some embodiments.

At block 406, one or more possible link dependencies between a container based on the new template and one or more other containers are determined based on the identified explicit and implicit metadata. As stated above, the explicit and implicit metadata includes one or more of environment variables, port bindings, or volume bindings in some embodiments. In some such embodiments, determining one or more possible link dependencies includes identifying one or more templates in the image registry which each provide one or more of the environment variables. Determining the one or more possible link dependencies also includes, in some embodiments, creating a match record in a relationship database for each identified template, as discussed above.

At block 408, container setting recommendations are provided to a user based on the one or more possible link dependencies and the identified explicit and implicit metadata. For example, a graphical user interface can be used to provide explicitly stated environment variables and bindings, as shown in the example in FIG. 5A. Additionally, a graphical user interface can be used to provide options or recommendations for possible container settings as shown in the example in FIG. 5B. If the user selects an image/template that does not match any record in the relationship database, a validation warning is provided to the user in some embodiments.

Hence, through the embodiments discussed above, a user is aided in building the application by automatically detecting environment variables and other settings and providing the recommendations to the user. Thus, the burden on the user is reduced as the user does not need to search through documentation to attempt to identify the proper settings for the application to execute properly.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
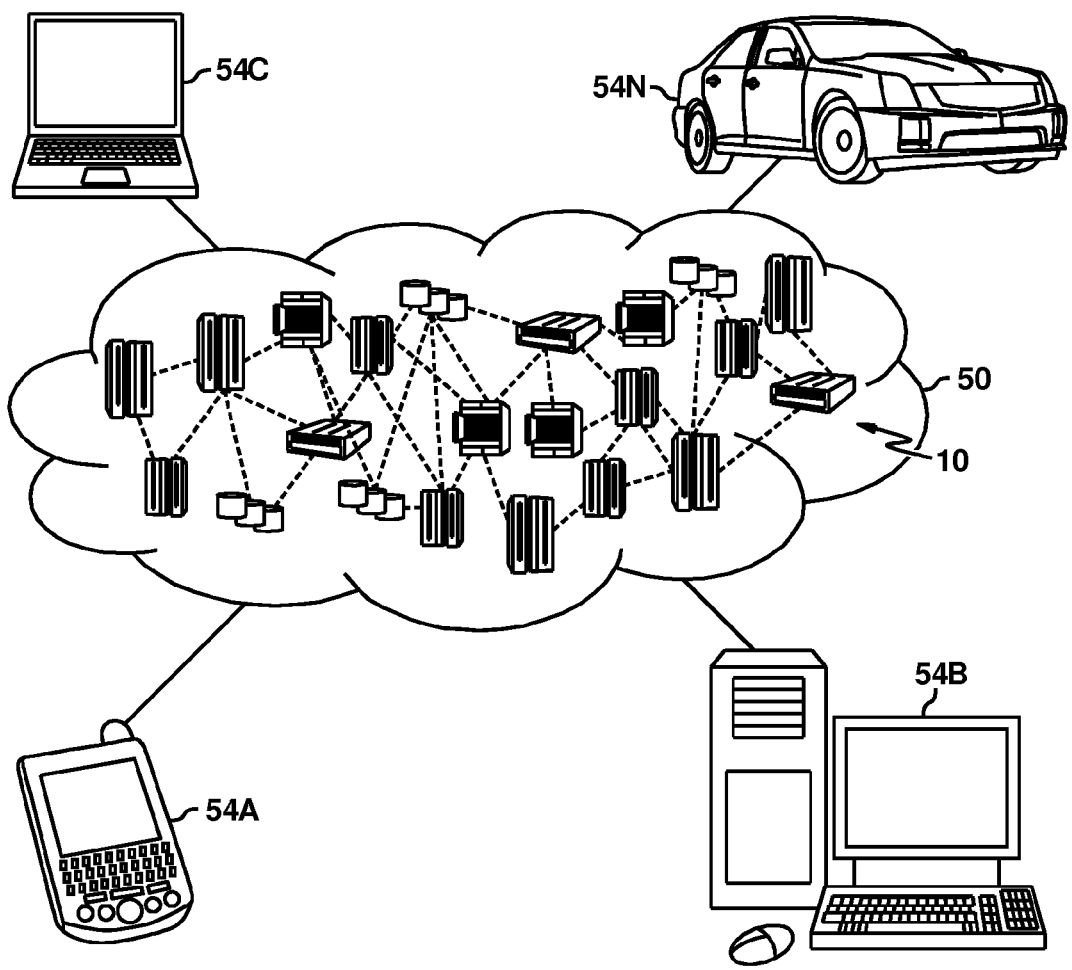
FIG. 6 depicts one embodiment of an example cloud computing environment.

FIG. 6 depicts an illustrative cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
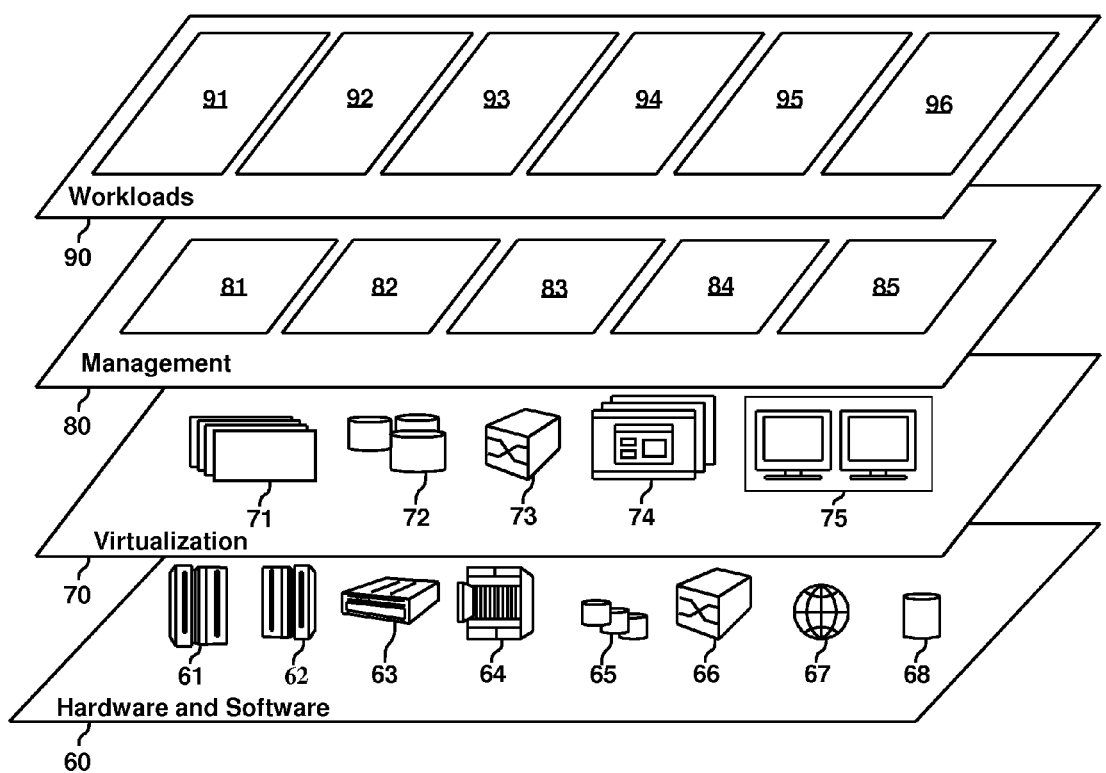
FIG. 7 depicts one embodiment of example abstraction model layers.

FIG. 7 depicts a set of functional abstraction layers provided by the cloud computing environment 50 shown in FIG. 6. It should be understood in advance that the components, layers, and functions shown in FIG. 6 are intended to be illustrative only. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recommendation modules 96. The recommendation modules 96 implement the functions described above for determining and providing one or more recommendation to a user for container attributes and settings.

Although specific embodiments have been illustrated and described herein, it will be appreciated by those of ordinary skill in the art that any arrangement, which is calculated to achieve the same purpose, may be substituted for the specific embodiments shown.

What is claimed is:

1. A computer-implemented method comprising:
   monitoring, by a processing unit, a template registry to detect a new template stored in the template registry;
   in response to detecting the new template stored in the template registry, analyzing, by the processing unit, the new template to identify explicit metadata and implicit metadata corresponding to the new template;
   determining, by the processing unit, one or more possible link dependencies between a container based on the new template and one or more other containers, respectively, based on the identified explicit metadata and implicit metadata corresponding to the new template; and
   outputting, by the processing unit, container setting recommendations to a user based on the determined one or more possible link dependencies and the identified explicit metadata and implicit metadata corresponding to the new template.

2. The computer-implemented method of claim 1, wherein analyzing the new template comprises:
   extracting the explicit metadata from the new template;
   executing one or more processes of the new template in a sandbox to identify the implicit metadata; and
   updating a metadata registry with the explicit metadata and the implicit metadata.

3. The computer-implemented method of claim 2, wherein the sandbox is a modified kernel of a Linux based operating system.

4. The computer-implemented method of claim 1, wherein the explicit metadata and the implicit metadata each include one or more of environment variables, port bindings, or volume bindings.

5. The computer-implemented method of claim 4, wherein determining the one or more possible link dependencies comprises:
   identifying one or more templates in the template registry, wherein each of the identified one or more templates in the template registry provides one or more of the environment variables; and
   creating a match record in a relationship database for each of the identified one or more templates in the template registry providing one or more of the environment variables.

6. The computer-implemented method of claim 5, wherein outputting the container setting recommendations to the user includes providing a validation warning to the user if a user selected template does not match any record in the relationship database.

7. A program product comprising a computer readable storage medium having program instructions embodied thereon, wherein the program instructions are configured, when executed by at least one programmable processor, to cause the at least one programmable processor to:
   monitor a template registry to detect a new template stored in the template registry;
   in response to detecting the new template stored in the template registry, analyze the new template to identify explicit metadata and implicit metadata corresponding to the new template;
   determine one or more possible link dependencies between a container based on the new template and one or more other containers, respectively, based on the identified explicit metadata and implicit metadata corresponding to the new template; and
   output container setting recommendations to a user based on the determined one or more possible link dependencies and the identified explicit metadata and implicit metadata corresponding to the new template.

8. The program product of claim 7, wherein the program instructions are further configured to cause the at least one programmable processor to analyze the new template by:
   extracting the explicit metadata from the new template;
   executing one or more processes of the new template in a sandbox to identify the implicit metadata; and
   updating a metadata registry with the explicit metadata and the implicit metadata.

9. The program product of claim 8, wherein the sandbox is a modified kernel of a Linux based operating system.

10. The program product of claim 7, wherein the explicit metadata and the implicit metadata each include one or more of environment variables, port bindings, or volume bindings.

11. The program product of claim 10, wherein the program instructions are further configured to cause the at least one programmable processor to determine the one or more possible link dependencies by:
   identifying one or more templates in the template registry, wherein each of the identified one or more templates in the template registry provides one or more of the environment variables; and
   creating a match record in a relationship database for each of the identified one or more templates in the template registry providing one or more of the environment variables.

12. The program product of claim 11, wherein the program instructions are further configured to cause the at least one programmable processor to output the container setting recommendations to the user which includes providing a validation warning to the user if a user selected template does not match any record in the relationship database.

13. A system comprising:
   a network interface;
   a template registry configured to store templates; and
   a processing unit communicatively coupled to the template registry and the network interface, wherein the processing unit is configured to monitor the template registry to detect a new template stored in the template registry and, in response to detecting the new template stored in the template registry, to analyze the new template to identify explicit metadata and implicit metadata corresponding to the new template;
   wherein the processing unit is further configured to determine one or more possible link dependencies between a container based on the new template and one or more other containers, respectively, based on the identified explicit metadata and implicit metadata corresponding to the new template; and wherein the processing unit is further configured to output container setting recommendations to a user via the network interface based on the determined one or more possible link dependencies and the identified explicit metadata and implicit metadata corresponding to the new template.

14. The system of claim 13, wherein to analyze the new template, the processing unit is further configured to:
    extract the explicit metadata from the new template; and
    execute one or more processes of the new template in a sandbox to identify the implicit metadata;
    wherein the system further comprises a metadata registry; and
    wherein the processing unit is further configured to update the metadata registry with the explicit metadata and the implicit metadata.

15. The system of claim 14, wherein the sandbox is a modified kernel of a Linux based operating system.

16. The system of claim 13, wherein the explicit metadata and the implicit metadata each include one or more of environment variables, port bindings, or volume bindings.

17. The system of claim 16, wherein to determine the one or more possible link dependencies, the processing unit is further configured to:
    identify one or more templates in the template registry, wherein each of the identified one or more templates in the template registry provides one or more of the environment variables; and
    create a match record in a relationship database for each of the identified one or more templates in the template registry providing one or more of the environment variables.

18. The system of claim 17, wherein to output the container setting recommendations to the user, the processing unit is further configured to provide a validation warning to the user if a user selected template does not match any record in the relationship database.

* * * * *